United States Patent [19]

Skowronski

[11] Patent Number: 5,155,766
[45] Date of Patent: Oct. 13, 1992

[54] PUSH-BUTTON PAY TELEPHONE DISPENSER

[75] Inventor: Richard E. Skowronski, Elk Grove Village, Ill.

[73] Assignee: GTE Airfone, Incorporated, Oakbrook, Ill.

[21] Appl. No.: 624,148

[22] Filed: Nov. 28, 1990

[51] Int. Cl.⁵ .............................. H04M 1/00
[52] U.S. Cl. .................. 379/438; 379/455; 379/428
[58] Field of Search ............ 379/438, 144, 58, 59, 379/455, 428, 449, 426

[56] References Cited

U.S. PATENT DOCUMENTS

| | | | |
|---|---|---|---|
| 4,117,276 | 9/1978 | Zurawski | 379/433 |
| 4,698,838 | 10/1987 | Ishikawa et al. | 379/58 |
| 4,727,569 | 2/1988 | Kutrieb et al. | 379/438 |
| 4,811,387 | 3/1989 | Hollewed et al. | 379/144 |
| 4,868,862 | 9/1989 | Ryoichi et al. | 379/438 |
| 4,940,859 | 7/1990 | Peterson | 379/438 |
| 4,965,824 | 10/1990 | Hollewed et al. | 379/144 |

FOREIGN PATENT DOCUMENTS

| | | | |
|---|---|---|---|
| 0161963 | 9/1984 | Japan | 379/438 |
| 0261055 | 10/1987 | Japan | 379/455 |

Primary Examiner—James L. Dwyer
Assistant Examiner—Jason Chan

[57] ABSTRACT

An improved telephone handset dispenser to store and dispense a telephone handset from the seat back of an airplane, including a housing for retaining the handset, a handset electrically attached to a cord which is dispensed from a cord reel contained within the housing, a protective bezel, and a self-resetting latching mechanism to retain the handset.

9 Claims, 6 Drawing Sheets

PUSH-BUTTON PAY TELEPHONE DISPENSER

BACKGROUND OF INVENTION

1. Field of Invention

The present invention relates to public pay telephones and, more particularly, to a telephone handset dispenser for dispensing a telephone handset when a button defined on the dispenser is pressed.

2. Description of Related Art

Many types of credit card operated pay telephones are currently known. Furthermore, a number of these telephones have been specifically designed for use by persons in mass transit applications.

One example of a telephone used in mass transit applications is called the "cabin phone". Typically, a single cabin phone is installed on a wall near the front or the rear of a vehicle such as a commercial aircraft. The cabin phone comprises a cordless telephone handset, a credit card reader, and a housing for both the handset and the credit card reader. A passenger initiates a call by placing a credit card into the credit card reader, whereupon the handset is dispensed from the housing. The passenger may then return to his or her seat and place a call using the handset. After completion of the call, the passenger returns the handset to the cabin phone whereupon the credit card reader returns the credit card.

The cabin phone has a number of limitations. First, electromagnetic noise from electrical equipment aboard the airplane often interferes with reception of the cabin phone handset because of its cordless design. Therefore, telephone pay stations that are free from electrical interference are needed for use by passengers in mass transit applications.

Another limitation of the cabin phone when considered for use aboard commercial aircraft is that space limitations aboard commercial aircraft usually preclude installation of more than two of the cabin phones. As a result, only two passengers at a time can place calls. Furthermore, each caller must leave his or her seat in order to use the cabin phone. Therefore, telephone pay stations are needed to enable several passengers to place calls simultaneously without leaving their seats.

Another class of pay telephones intended for use by passengers in mass transit applications is called the "seat-mounted phone". The seat-mounted phone is used in a system that includes several pay telephone housings installed in seat backs of the seats aboard a vehicle such as a commercial aircraft. A passenger uses a seat-mounted phone located in one of the seat backs of the row directly in front of the passenger. When the passenger inserts a credit card into an opening provided in the housing for that purpose, a telephone handset is dispensed from a storage trough formed within the housing. The handset is connected to the housing by a retractable cord which is spooled upon a cord reel. The cord reel itself is, in a typical construction, mounted off-center with respect to the ends of the storage trough so that the cord exits the cord reel tangentially to the circular perimeter of the cord reel.

Examples of seat-mounted phones as discussed above are shown in and described in the following U.S. patents and U.S. patent application, assigned to the assignee of the present invention: U.S. Pat. No. 4,881,254, entitled "Hand-Held Pay Telephone and Holder", to Goeken et al.; U.S. Pat. No. 4,811,387, entitled "Holder and Credit-Card Unlatching Mechanism for a Hand-Held Telephone", to Hollowed et al.; and U.S. Ser. No. 288,940 entitled "Holder and Latching Mechanism for a Hand-Held Telephone", filed Dec. 23, 1988 in the name of Jerome L. Oldani.

While seat-mounted phones as referred to and described above and in the above-mentioned patents and patent application meet most passenger requirements, there are some passenger requirements that are not fully satisfied by such phones. In particular, installation of seat-mounted phones can be complicated somewhat because the handset housing is a separate part from the cord reel. Thus, installation of the seat-mounted phone involves the steps of mounting the handset housing, mounting the cord reel, and adjusting the cord reel to properly interact with the handset housing. Therefore, installation time is increased because the seat-mounted phone package is made up of at least two separate pieces.

An additional design constraint of the seat-mounted phone results from the fact that the cord must exit the cord reel tangentially to the cord reel's circular perimeter in order to longitudinally continue without bending into the center of one of the storage trough's ends. As a consequence of this design constraint, the seat-mounted phone must have a greater vertical dimension than might be preferred for aircraft applications and is therefore less compact than might be desired given the constraints of space limitations in a commercial aircraft environment.

Additionally, the width of the seat-mounted phone, as compared to the width of a typical seat back, is also often greater than might be preferred. Because of this, a seat-mounted phone housing may be required to be cut in order to reduce its width for proper installation of the housing. Furthermore, custom installations are sometimes required, wherein some of the seat-mounted phone's mechanical or electrical components are located beneath the seat. Hence, installation of the current seat-mounted phone consumes more time than might be desired in a commercial aircraft application and is somewhat complicated because the width of the seat-mounted phone is greater than might be preferred. Accordingly, a more compact telephone pay station for use by mass transit passengers would have value for the seat back application discussed above.

Another design constraint of the seat-mounted phone is that removal of its handset housing requires the use of tools. Removal of a seat-mounted phone handset housing is needed in a variety of situations. Since the handset housing is mounted in an opening cut in the upholstery of a seat back, one function of the handset housing is to trap the seat's upholstery around the opening. Thus, if the upholstery is soiled or damaged during a flight, the handset housing must be removed prior to removal and replacement of the upholstery. Similarly, if the handset housing is damaged, removal of the handset housing for replacement or repair is required. Likewise, if the handset housing is dirtied, removal for cleaning is required.

Often, union rules prohibit cleaning personnel from using tools aboard aircraft. As a result, simple problems such as those described above often require a union-approved, certified aircraft mechanic to remove a seat-mounted phone handset housing. Due to their level of training, certified aircraft mechanics are typically not as readily available as ordinary cleaning personnel. In addition, certified aircraft mechanics are usually paid a greater wage than ordinary cleaning personnel. Therefore, when problems such as the above-mentioned arise during a particular leg of a flight, having the problem remedied by a certified aircraft mechanic can result in delay and irritation to passengers, as well as added expense to the airline. Therefore, an easily serviceable telephone pay station is necessary.

Another shortcoming of the seat-mounted phone, especially for aircraft applications, is that it is presently molded from a material which yellows when exposed to ultraviolet light. Most plastic components of a typical commercial airplane's interior require replacement every two or three years, due to this type of color degradation. Because ultraviolet light is more intense at high altitudes, and seat-mounted phones are usually installed near windows, the phones are especially susceptible to yellowing. Since replacement of telephone pay stations is costly and time consuming, a telephone pay station is needed that is not susceptible to color degradation in response to ultraviolet light.

Another factor that may be of importance to passengers using seat-mounted phones is the ease of making calls. With the existing technology, a telephone handset is dispensed from a housing in response to the user's insertion of a credit card into an opening defined in the housing for that purpose. The user is then required to use the credit card in another, separate operation. Specifically, the user must swipe the credit card through a groove in the handset, thereby enabling the handset to read the credit card's magnetic strip. Despite instructional materials made available to passengers making calls, some passengers occasionally mistakenly think that the credit card's magnetic strip was read during the initial insertion of the credit card into the opening defined in the handset housing. As a result, those passengers have sometimes been confused by the subsequent requirement of swiping the credit card through the groove in the handset. Therefore, a telephone pay station that does not require use of a credit card in order to release the telephone handset offers certain advantages from the standpoint of ease of use.

Another class of pay telephones intended for mass transit applications is called the "armrest-mounted phone". The armrest-mounted phone is used in a system including several pay telephone housings installed beneath armrests of the seats of a vehicle such as a commercial aircraft. A passenger uses an armrest-mounted phone mounted in either of the two armrests between which the passenger is seated. When the caller inserts a credit card into an opening provided in the housing for that purpose, a telephone handset is dispensed from a storage trough formed within the housing. The handset is connected to the dispenser by a retractable cord which is spooled upon a cord reel.

Examples of armrest-mounted phones as discussed above are described and shown in the following U.S. patent applications, assigned to the assignee of the present invention: U.S. Ser. No. 278,391, entitled "Dispenser and Unlatching Mechanism for a Hand-Held Pay Station Telephone", filed Dec. 1, 1988 in the names of Edward J. Hollowed and Jerome L. Oldani; U.S. Ser. No. 278,392, entitled "Pay Station Telephone and Dispenser for a Commercial Conveyance", filed Dec. 1, 1988 in the names of Edward J. Hollowed and Jerome L. Oldani; and U.S. Ser. No. 278,393, entitled "A Hand-Held Pay Station Telephone Dispenser and Cord Retractor", filed Dec. 1, 1988 in the names of Edward J. Hollowed and Jerome L. Oldani.

While the armrest-mounted phone referred to and described above and in the above-mentioned patent applications meets most passenger requirements, it too has certain design constraints which limit its use in applications contemplated by the present invention. For example, to accommodate the armrest-mounted phone, the armrest to which the phone is to be connected must be substantially enlarged. Furthermore, if the armrest accommodating the armrest-mounted phone is raised to its concealed position between the two seats to which the armrest is connected, for example, to give passengers in adjacent seats greater freedom of movement or to permit a passenger to lie across two or more seats, the hardware of the armrest-mounted phone will protrude from between the seats and possibly inconvenience the passengers from the standpoint of comfort. Furthermore, convenient use of an armrest-mounted phone is limited to the two passengers seated adjacent to the armrest to which the phone is attached.

Therefore, a telephone pay station is needed that does not restrict operation of the armrests aboard a mass transit vehicle, yet allows passengers to place calls without leaving their seats.

SUMMARY OF THE INVENTION

Accordingly, it is an object of the present invention to provide a telephone handset that functions in an aircraft or similar environment without significant signal deterioration due to electromagnetic interference.

It is a further object of the invention to provide telephone pay stations which can be mounted at various locations aboard a mass transit vehicle such as an aircraft, to enable several passengers to place calls simultaneously without leaving their seats.

It is still another object to provide a telephone pay station of compact size.

It is a further object to provide a telephone pay station that can be easily installed.

It is another object to provide a telephone pay station that can be easily cleaned and serviced without using tools.

It is a further object of the invention to provide a telephone pay station that is simple to operate.

It is still another object of the present invention to provide a telephone pay station that is not susceptible to color degradation due to ultraviolet light.

The above and other objects of the invention are attained by a telephone pay station in accordance with the present invention that provides a passenger, including a passenger seated behind another seat of a mass transit vehicle, with a convenient means to make telephone calls without leaving his or her seat.

A telephone housing in accordance with the present invention is adapted for mounting in a seat back, including those aboard commercial aircraft. The housing has a longitudinal storage trough defined therein for storing a normally inactive telephone handset. The telephone handset is connected to a cord which is dispensed from a cord reel contained within the housing. The telephone housing also has a rectangular opening defined therein. Residing within the rectangular opening is a button, formed upon a self-resetting latch. The self-resetting latch secures the handset in the storage trough or, alternately, urges the handset from the storage trough in response to pressure on the rectangular button. As the telephone handset is moved away from the housing, the cord reel rotates in order to unwind additional cord for use by the caller.

Operation of the present invention provides a number of benefits for its users. First, the telephone pay station housing and the telephone handset are connected by a wire, rather than a radio link. Therefore, the effect of electromagnetic noise on operation of the invention is sharply reduced.

Another benefit is the compact size of the housing. In the present invention, the cord reel is mounted to the housing so that the cord reel and housing together are smaller than cord reel-housing arrangements of the existing technology discussed above. This benefit is achieved in part by centering the cord reel of the present invention with respect to the storage trough from which the telephone handset is dispensed.

Another benefit is the simplified installation afforded by the present invention. Due to the compact size of the housing of the present invention, it can be installed without modification in any aircraft seat currently in use. No reduction in the length of the housing is needed. No modification of the housing is needed to accommodate a tray table latch. In addition, no components require relocation beneath the seat. Furthermore, the cord reel is mounted inside the housing before installation of the telephone pay station, so that the housing and cord reel can be installed as a single piece. Therefore, the present invention is compact, and has features that provide for convenient installation.

Another benefit of the present invention is that it can be easily serviced. Unlike prior arrangements, the housing is protected by a bezel that is removable without tools. Since the bezel protects the housing from becoming damaged or soiled, the bezel, rather than the housing, can be quickly removed or replaced. The bezel additionally serves to trap the upholstery around the opening of the seat in which the housing is mounted. Consequently, if the upholstery is damaged or soiled, the upholstery surrounding the housing can be released simply by removing the bezel. Furthermore, these operations can be performed without tools by ordinary cleaning personnel, saving time and effort. Therefore, the present invention has features that provide for simplified servicing.

Another benefit, unlike prior arrangements, is that the present invention is made from material that does not degrade when exposed to ultraviolet light. As a result, the invention does not require periodic replacement due to unsightly yellowing.

Still another advantage is the present invention's simplified operation. Unlike prior arrangements, a caller presses a button in order to receive the telephone handset. Subsequently, the caller swipes a credit card through a groove in the handset, in order to have the card's magnetic strip read. Thus, a credit card is only required for a single operation, thereby affording the user a simplified method of operation.

DESCRIPTION OF THE PREFERRED EMBODIMENT

Referring now to the drawings, a preferred embodiment of the invention will be described. The invention provides a compact telephone pay station especially suited for use aboard mass transit vehicles.

An inactive telephone handset is retained in a storage trough defined within a telephone handset housing. When a caller presses a button defined on the face of the housing, the telephone handset is dispensed from the trough for subsequent use. Upon replacement of the telephone handset into the trough, a latching mechanism secures the telephone handset therein.

Figures 1, 2, 6:
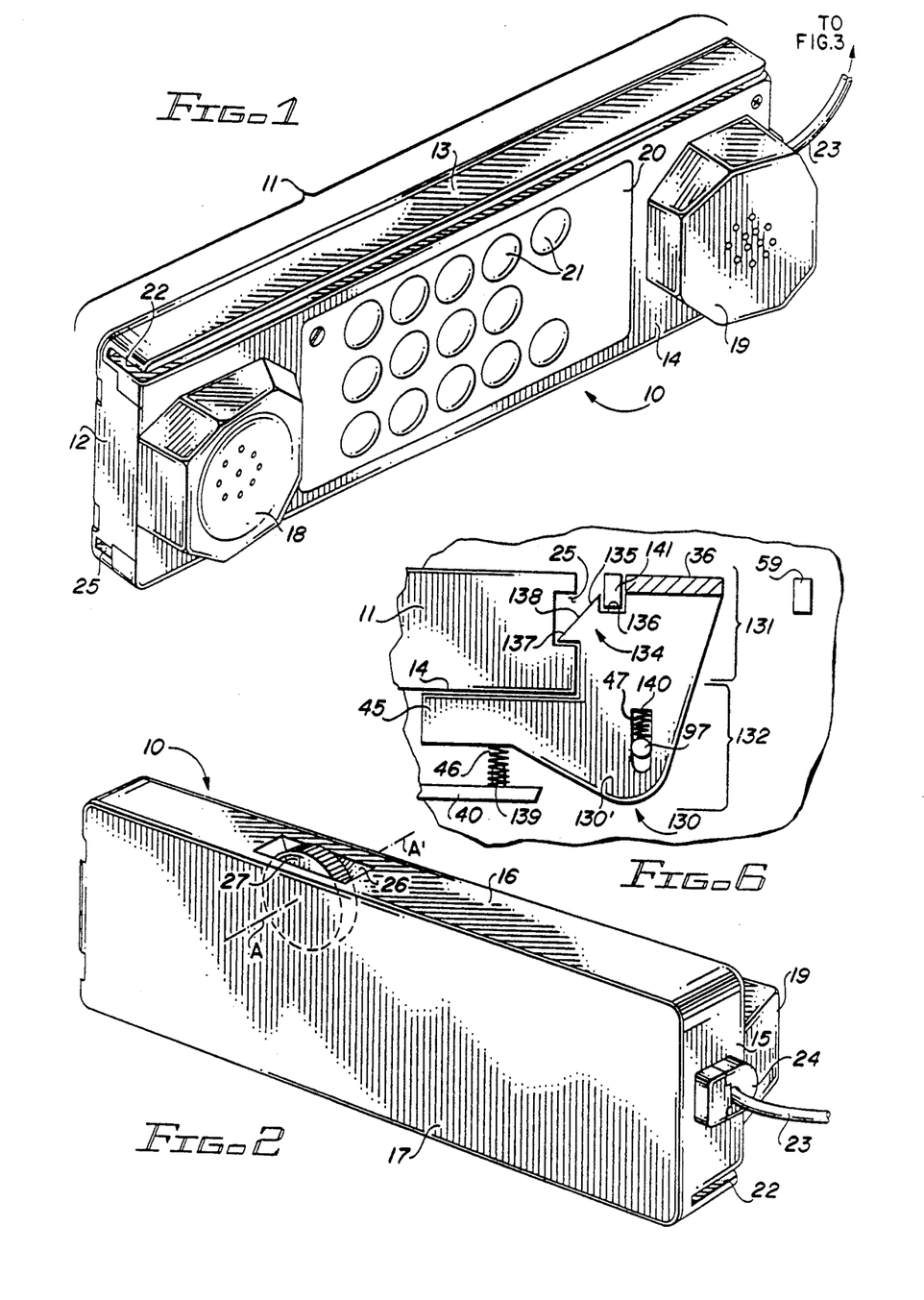
FIG. 1 is a front perspective view of the telephone handset used by the present invention.
FIG. 2 is a rear perspective view of the telephone handset used by the present invention.
FIG. 6 is an orthogonal side view of the latching mechanism 130 of the present invention in the fully latched position, cut-away from the line B—B' shown in FIG. 3.
Figure 5:
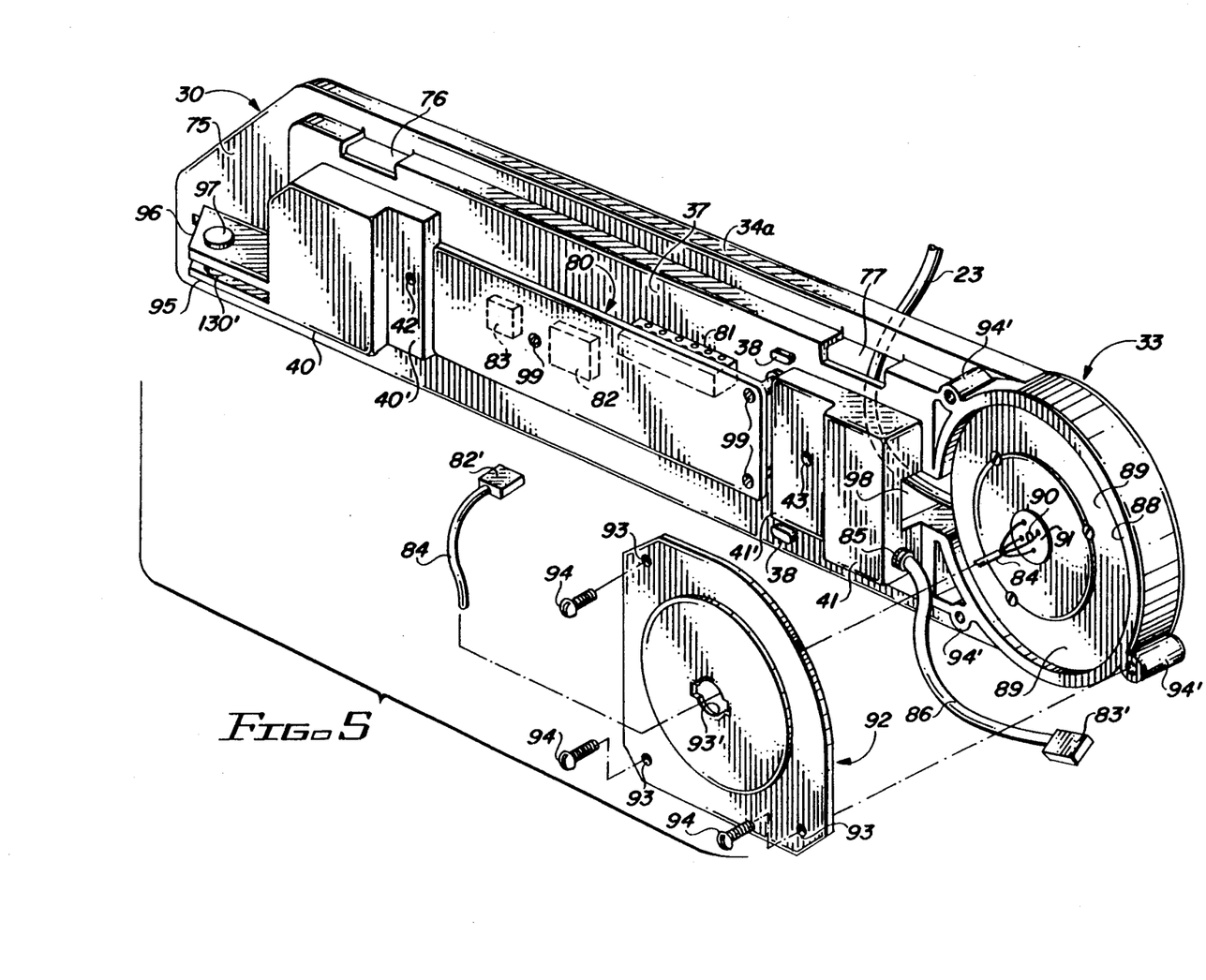
FIG. 5 is a rear perspective view of the telephone handset housing and cord reel cover of the present invention.

The principal components of the present invention include a telephone handset 10, shown most clearly in FIGS. 1 and 2, a telephone handset housing 30, shown most clearly in FIGS. 3, 3A, 5, and 7, a cord reel assembly 33, shown most clearly in FIG. 5, and a latching mechanism 130, shown most clearly in FIGS. 6 and 9-16.

Referring now to FIGS. 1 and 2, the telephone handset 10 will be described. The handset 10 is formed from an ultraviolet light-resistant material such as a polycarbonate material, and is consequently stabilized against color degradation due to ultraviolet light. The fundamental component of the telephone handset 10 is a box-shaped body 11. The body 11 has an end 12, a side 13, and a front face 14. In addition, the body 11 has an end 15, a side 16, and a rear face 17. The end 15, side 16, and rear face 17 are parallel and opposite to the end 12, side 13, and front face 14, respectively, thereby collectively forming a generally rectangular box-like configuration for the body 11. A latching recess 25 is defined within the end 12. A speaker 18 and a microphone 19 protrude from and are formed on the face 14. In addition, a keypad 20 is provided on the face 14 to enable a user to operate the handset 10 by pressing a plurality of keys 21. A long narrow groove 22 is provided within the body 11 for slidably receiving a credit card as part of the operation of the handset 10.

Additionally, the handset 10 includes a collar 24 formed upon the end 15 of the body 11. A cord 23 passes through the 13 collar 24 and is electrically attached to a handset circuit, not shown, located inside the body 11. The handset circuit performs standard telecommunications functions of the handset 10 as are readily understood by those having ordinary skill in the art of telephony.

The handset 10 further includes a rectangular opening 26, defined within the side 16. Protruding through the opening 26 is a knurly disk-shaped dial 27 for adjusting the parameters of the handset circuit in order to change the volume of the signal received by the speaker 18. The dial 27 rotates about the axis defined by the line A—A'.

Figures 3, 4:
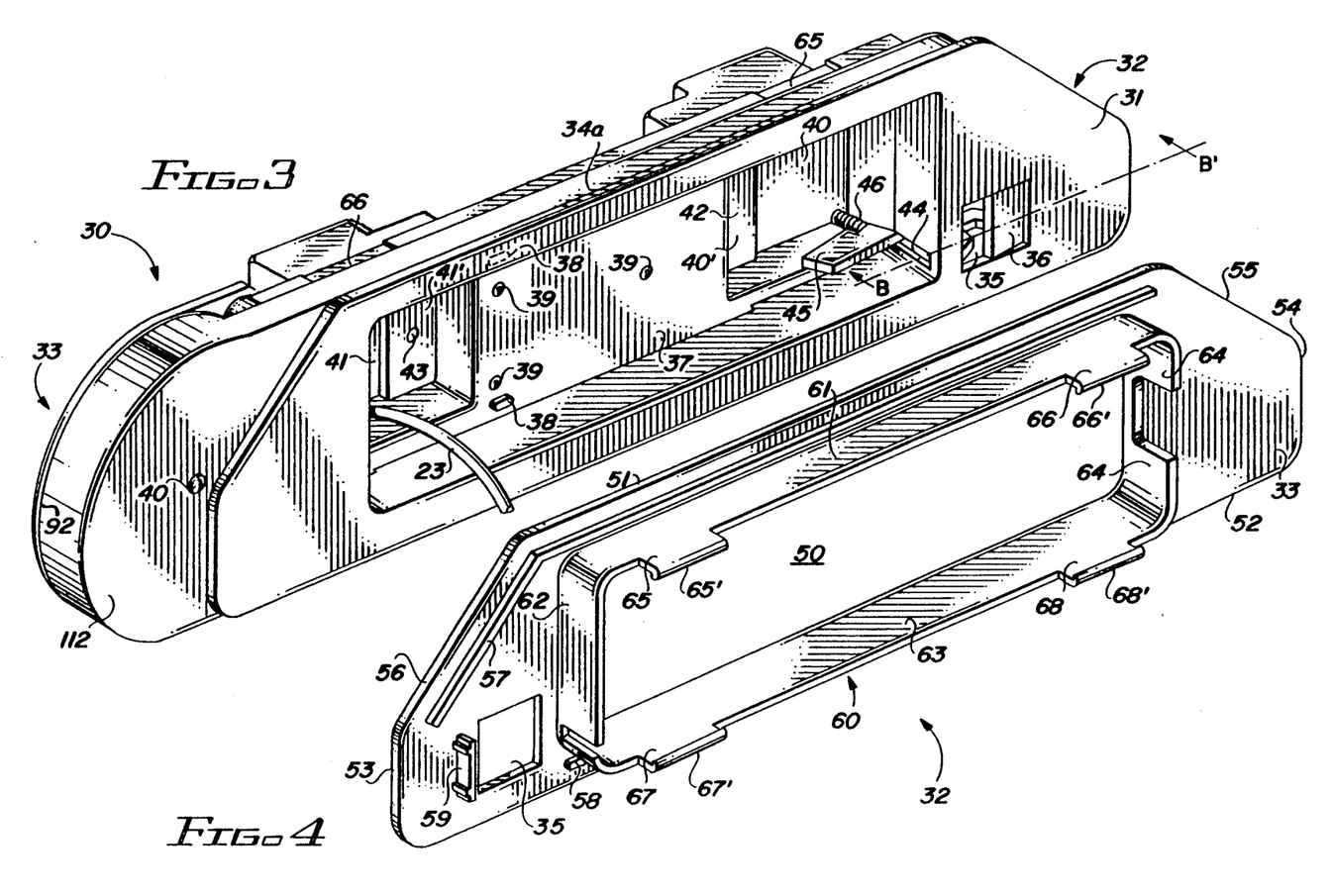
FIG. 3 is a front perspective view of the telephone handset housing of the present invention, with the bezel attached.
FIG. 4 is a rear perspective view of the bezel of the present invention.
Figure 7:
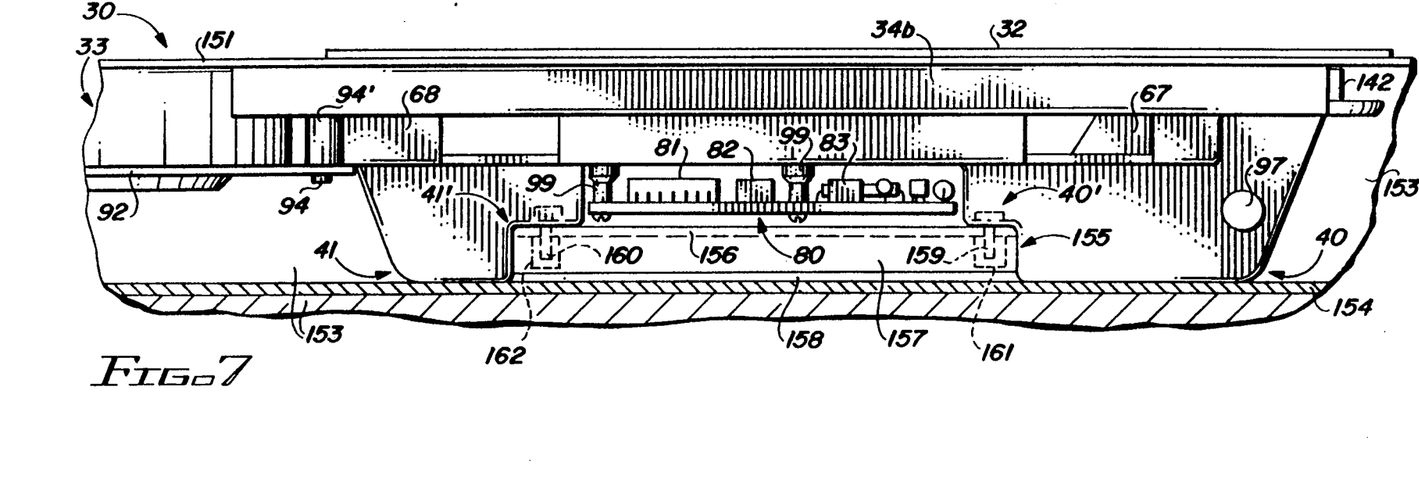
FIG. 7 is an orthogonal side view of the telephone handset housing and mounting apparatus of the present invention.

Referring now to FIG. 3, there is shown the telephone handset housing 30 with which the handset 10 is used. The housing 30 is shown with a bezel 32 attached thereto. The housing 30 is typically also formed from an ultraviolet light-resistant material such as a polycarbonate material and is therefore stabilized against color degradation due to ultraviolet light. The housing 30 has a front surface formed by a six-sided face 31 of the bezel 32 and by a planar surface 112 of the aforementioned cylindrical cord reel assembly 33. A rear surface 75, shown in FIG. 5, is parallel to the front surface of the housing 30. A side 34a is perpendicular to both front and rear surfaces. Likewise, a side 34b, shown in FIG. 7, is perpendicular to both front and rear surfaces and parallel to the side 34a. Also perpendicular to the front and rear surfaces is an end, not shown.

Still referring to FIG. 3, additional features of the bezel 32 and the housing 30 will be described. In particular, a rectangular opening 35 is defined within the six-sided face 31 of the bezel 32. Protruding through the opening 35 is a rectangular button 36 of a latching mechanism 130, shown in FIGS. 6 and 9-16. In addition, the bezel 32 has a generally rectangular opening 50 defined therein, shown more clearly in FIG. 4. The housing 30 has a longitudinal storage trough 37 defined therein, corresponding to the rectangular opening 50 of the bezel 32 when the bezel 32 is attached to the housing 30. The trough 37 is rectangular, so as to provide a receptacle for receiving and retaining the handset 10 in snug relationship.

The trough 37 includes a number of additional features, as are best shown in FIG. 3. In particular, two resilient compressive buttons 38, the purpose of which will be explained hereinafter, are connected to the trough 37. The buttons 38 are tightly maintained within holes (not shown) defined in the trough 37, from which the buttons 38 protrude. Additionally, holes 39, the purpose of which will be explained hereinafter, are defined within the trough 37. Another feature of the trough 37 is a speaker cup 40 defined therein, and of dimensions suitable for receiving the speaker 18 of the telephone handset 10. Also defined within the trough 37 is a microphone cup 41, of dimensions suitable for receiving the microphone 19 of the telephone handset 10. A raised portion 41', formed on the microphone cup 41, has a hole 43 defined therein. Similarly, a raised portion 40', having a hole 42 defined therein, is formed on the speaker cup 40. The purposes of the portions 40' and 41' and the holes 42 and 43 will be explained hereinafter.

The speaker cup 40 additionally includes a rectangular latching slot 44 defined therein. A leg 45 of the latching mechanism 130 (not shown) extends through the latching slot 44. In addition, a spring 46 is interposed between the leg 45 and the speaker cup 40.

Figure 3A:
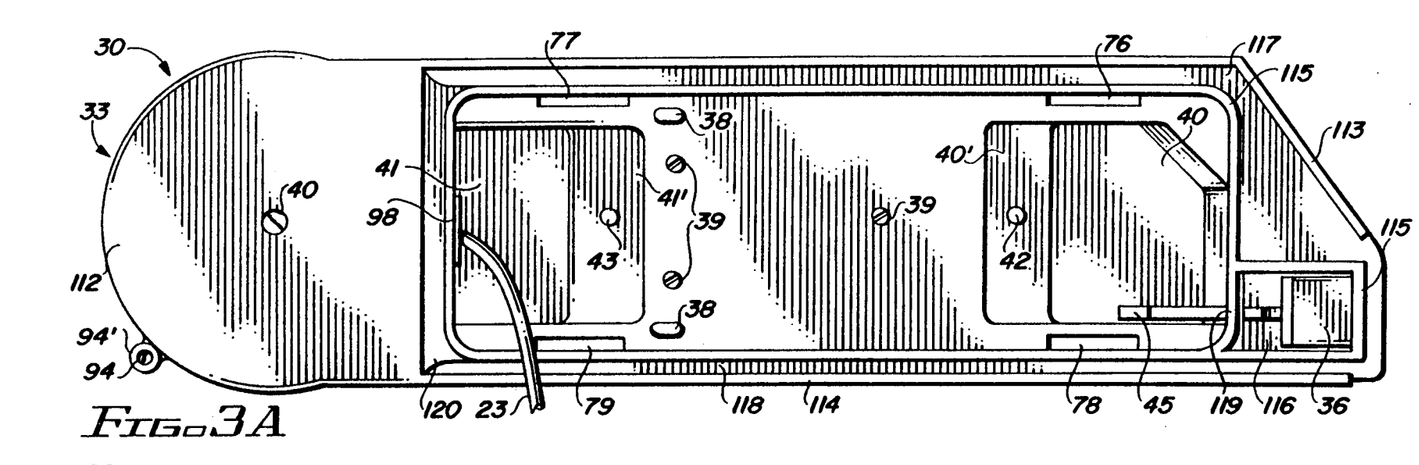
FIG. 3A is a front plan view of the telephone handset housing of the present invention, with the bezel removed.

Referring now to FIG. 3A, a front plan view of the telephone handset housing 30, with the bezel 32 removed, will be described. The cord reel assembly 33 defines a planar surface 112, as discussed hereinabove. An outer ridge 113 is formed upon the housing 30, adjacent to the side 34a (FIG. 3). Similarly, an outer ridge 114 is formed upon the housing 30, adjacent to the side 34b (FIG. 7). In addition, an inner ridge 115 is formed upon the housing 30. An aperture 116 is defined within the housing 30. The aperture 116 corresponds to the opening 35 of the bezel 32 when the bezel 32 is inserted into the housing 30. The inner ridge 115 surrounds the trough 37 and additionally extends around the aperture 116. A portion of the ridge 115 between the aperture 116 and the trough 37 will be referred to as ridge 119. The ridges 113, 114, 115, and 119 form a surface that lies in a plane that is parallel and slightly raised with respect to the planar surface 112 of the cord reel assembly 33.

The housing 30 further includes a shallow channel 117, defined in the housing 30 between the inner ridge 115 and the outer ridge 113. Similarly, a channel 118 is defined in the housing 30 between the inner ridge 115 and the outer ridge 114. Furthermore, a channel 120 is defined in the housing 30 between the inner ridge 115 and the cord reel assembly 33. The channels 117, 118, and 120 define a recessed portion of the housing 30 that is generally planar, and is additionally parallel to the surface formed by the ridges 113, 114, 115, 119 and the planar surface 112.

Referring now to FIGS. 3, 3A, and 4, the bezel 32 will be described. The bezel 32 is also typically formed from an ultraviolet light-resistant material such as a polycarbonate material, and is therefore stabilized against color degradation due to ultraviolet light. The bezel 32 primarily comprises a six-edged, planar, polygonal front face 31 and a similarly shaped rear face 33. An edge 51 is parallel to an edge 52. An edge 53 and an edge 54 are parallel to each other, and mutually perpendicular to the edge 51 and the edge 52. An edge 55 is obliquely interposed between the edge 51 and the edge 54. Similarly, an edge 56 is obliquely interposed between the edge 51 and the edge 53.

The bezel 32 further includes an elongated ridge 57, formed upon the rear face 33. The ridge 57 is positioned adjacent to the edges 51 and 56, and is parallel thereto. Additionally, an elongated ridge 58 is formed upon the rear face 33, adjacent and parallel to the edge 52. Furthermore, the ridges 57 and 58 are positioned to reside within the channels 117 and 118 (FIG. 3A), respectively, when the bezel 32 is inserted into the housing 30. A barrier 59 protrudes perpendicularly from the rear face 33, between the opening 35 and the edge 53, and is positioned to reside within the aperture 116 (FIG. 3A) in the housing 30, adjacent to the ridge 115, when the bezel 32 is inserted into the housing 30.

A further feature of the bezel 32 is a flange 60, formed upon the rear face 33. The flange 60 extends perpendicularly to the rear face 33, so as to surround the opening 50 defined in the bezel 32. The flange 60 and the opening 50 are positioned so as to correspond to the trough 37 when the bezel 32 is attached to the housing 30. The flange 60 has a rectangular cross-section defined by a side 61, a side 62, a side 63, and a side 64. A pair of tabs 65 and 66 are formed upon the side 61 of the flange 60. Similarly, a pair of tabs 67 and 68 are formed upon the side 63. Formed upon the tabs 65-68 are barbs 65'-68', respectively.

Referring now to FIG. 5, a rear view of the telephone handset housing 30 with the bezel 32 removed will be described. The rear surface 75 of the housing 30 is shown. In addition, the trough 37 is shown in relation to the rear surface 75. The trough 37 has four rectangular openings 76-79 (shown more clearly in FIG. 3A) for receiving the tabs 65-68, respectively, of the bezel 32. Upon insertion of the tabs 65-68 into the openings 76-79, the trough 37 is grasped by the barbs 65'-68' of the tabs 65-68 thereby attaching the bezel 32 to the housing 30.

The rear view of the housing 30 shown in FIG. 5 further shows a housing circuit 80 interposed between the speaker cup 40 and the microphone cup 41. Control of the present invention's electronic functions is performed by the housing circuit 80 in conjunction with remotely located central communications circuitry, not shown, and the handset circuit, not shown. The circuit 80 is held in place by pedestals 99 which protrude into holes 39 (FIGS. 3 and 3A) of housing 30. Electrically attached to the housing circuit 80 is a connector 81, a connector 82, and a connector 83. The housing circuit 80 can be electrically attached to the remotely located central communications circuitry 80 by the connector 81.

The housing 30 also includes a switch 85, which is mounted in an aperture (not shown) defined in the microphone cup 41. The switch 85 protrudes into the microphone cup 41, and functions to detect the presence or alternately the absence of the handset 10 in the trough 37. The switch 85 is electrically attached to a wire 86. The wire 86 is electrically attached to a connector 83' which can be electrically attached to the housing circuit 80 via the connector 83.

Still referring to FIG. 5, the cord reel assembly 33 will be described. A curved portion of the housing 30 defines a generally cylindrical shell 88. A spool-shaped cord reel 89, residing within the cylindrical shell 88, is provided for storage of the cord 23. The cord reel 89 is of a dimension slightly smaller than that of the shell 88 so that the shell 88 provides a receptacle for maintaining the cord reel 89 in snug relationship. Additionally, the cord 23 is guided by the shell 88 from the cord reel 89 into an aperture 98 formed in the microphone cup 41. The cord reel 89 rotates about an axial bolt 90 which is surrounded by a concentric cylindrical connector 91. The connector 91 is electrically attached to a wire 84. The wire 84 is electrically attached to a connector 82' which can be electrically attached to the connector 82, thereby electrically attaching the cord reel 89 to the housing circuit 80.

In cooperation with the shell 88, a cord reel cover 92 functions to enclose the cord reel 89. The cover 92 has three holes 93 defined therein and is secured to the housing 30 by fastening devices 94 which are passed through the holes 93 and connected to corresponding sockets 94' of the housing 30. Furthermore, the cover 92 has a center hole 93' defined therein for routing the wire 84.

Referring now to FIG. 6, the latching mechanism 130 of the present invention, in the fully latched position, will be described. The latching mechanism 130 is an integral member also formed from an ultraviolet light-resistant material such as a polycarbonate material, and is therefore stabilized against color degradation due to ultraviolet light. The latching mechanism 130 includes a generally broad, flat body 130'. In FIG. 6, the body 130' is shown in relation to other components of the invention, including the speaker cup 40 and the handset body 11. The body 130' has a first section 131 and a second section 132. The rectangular button 36 is shown in FIG. 6 in a cross-sectional view. The button 36 is mounted upon the first section 131, in a direction perpendicular thereto. The button 36 is bisected by its intersection with section 131 of the body 130'.

The body 130' additionally includes a catch 134, formed on the section 131 of the body 130'. The catch 134 has a ridge-engaging tooth 135 that extends from the catch 134 in a first direction. Thus, a notch 136 is defined between the tooth 135 and the region of the section 131 adjacent to the button 36. The size of the notch 136 is slightly larger than a cross-sectional portion 141 of the ridge 119. Thus, the ridge 119 can be securely maintained within the notch 136. In addition to the ridge-engaging tooth 135, the catch 134 has formed thereon a handset-engaging tooth 137, extending therefrom in a second direction, generally perpendicular to the first direction, mentioned above. The tooth 137 resides within the latching recess 25 of the handset 10 when the handset 10 and the latching mechanism 130 are in the fully latched position. Interposed between the tooth 135 and the tooth 137 is an inclined plane 138, formed upon the catch 134.

The body 130' has several additional features. In particular, a leg 45 is formed upon the section 132. The leg 45 extends from the section 132 in a direction generally parallel to the direction in which the tooth 137 extends from the catch 134. In the fully latched position, a spring 46 is compressed between the leg 45 and the speaker cup 40, thereby pressing the leg 45 against the front face 14 of the handset 10. The spring 46 is connected to a cylindrical nub 139, formed upon the speaker cup 40.

Also defined within the section 132 is an elongated aperture 140. A cylindrical pivot pin 97 resides in the aperture 140, in an orientation that is perpendicular to the body 130'. Also residing within the aperture 140 is a spring 47, which is compressed between the pin 97 and a portion of the body 130' adjacent to the aperture 140. The pivot pin 97 is held in position by a fin 95 and a fin 96, as best shown in FIG. 5. The fins 95 and 96 are formed on the speaker cup 40 and rear surface 75 of the housing 30. Thus, the body 130' is permitted to rotate about the pin 97. Additionally, the body 130' is simultaneously permitted to slide, as guided by the interaction between the pin 97 and the portion of the body 130' surrounding the aperture 140

Figure 8:
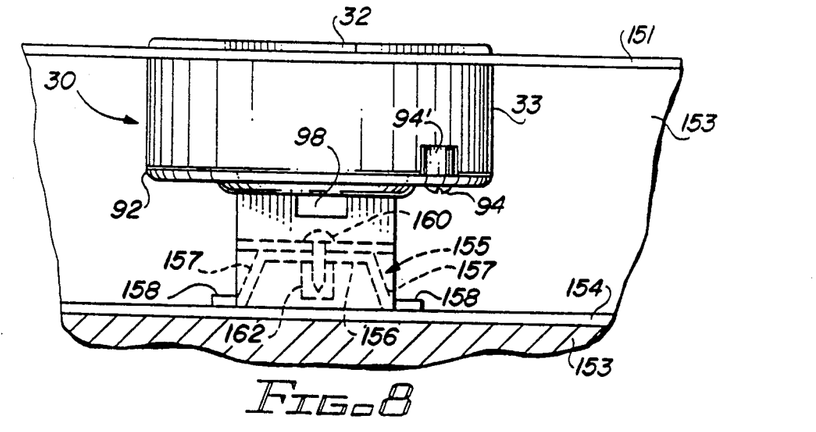
FIG. 8 is an orthogonal end view of the telephone handset housing and mounting apparatus of the present invention.

The apparatus for mounting the present invention will be described by referring to FIGS. 7 and 8, where the housing 30 is shown installed in a typical seat back. In order to more clearly describe the apparatus for mounting the invention, the switch 85 is not shown in FIGS. 7 and 8. The outermost covering of a typical seat back comprises a layer of upholstery 151. Beneath the upholstery 151 lies a layer of seat cushion 153. Furthermore, beneath the seat cushion 153 is a diaphragm 154. The diaphragm 154 is a thin, flat piece of durable, yet lightweight material, such as aluminum. Typically, the diaphragm 154 is used to provide inner support for the seat. An additional seat cushion 153 is located beneath the diaphragm 154.

In order to mount the housing 30 in the seat back, an opening (not shown) is formed in the upholstery 151, the opening having nearly the same shape and size as the ridge 115, and additionally forming an edge (not shown) of the upholstery 151. Furthermore, an opening (not shown) in the seat cushion 153 is formed corresponding to the opening in the upholstery 151. Then, the housing 30 is fully inserted into the openings in the upholstery 151 and the cushion 153, and the upholstery 151 is placed over the housing 30. Subsequently, the edge of the upholstery 151 is secured by fully inserting the bezel 32 into the housing 30 so that the tabs 65'-68' engage With the regions of the trough 37 surrounding the openings 76-79. In this position, the upholstery 151 is tightly maintained between the rear face 33 of the bezel 32 and the ridges 113, 114, and 115; between the rear face 33 and the surface 112; between the ridge 57 and the channel 117; and between the ridge 58 and the channel 118. Beneath the upholstery 151, the housing 30 is surrounded by the seat cushion 153 and is connected to the diaphragm 154.

The connection between the diaphragm 154 and the housing 30 is achieved by a mounting bracket 155. The mounting bracket 155 has a flat, rectangular roof 156. Two flat, rectangular sides 157 are obliquely connected to opposing longitudinal edges of the roof 156. Furthermore, each side 157 has a flat, rectangular base strip 158 obliquely connected thereto. The base strips 158 are typically positioned flatly against the diaphragm 154 and joined to the diaphragm 154 by rivets or welds, not shown. When the housing 30 is secured to the diaphragm 154 by the mounting bracket 155, the speaker cup 40 and the microphone cup 41 contact the diaphragm 154, as is best shown in FIG. 7. Specifically, the recessed portions 40, and 41' of the speaker cup 40 and the microphone cup 41, respectively, abut against the roof 156 of the mounting bracket 155. A fastening device 159 is passed through the hole 42 (shown in FIG. 5) of the recessed portion 40'. Similarly, a fastening device 160 is passed through the hole 43 (shown in FIG. 5) of the recessed portion 41'. In addition, fastening devices 159 and 160 are passed through holes, not shown, in the roof 156. The fastening devices 159 and 160 are connected to anchor nuts 161 and 162, respectively, thereby securing the housing 30 to the roof 156.

Referring to the various drawings as described above, the function of the present invention will now be described. During normal operation of the invention, the bezel 32 is fully inserted into the housing 30. The flange 60 of the bezel 32 is positioned within the trough 37 of the housing 30, and the opening 35 of the bezel 32 is aligned with the aperture 116 in the housing 30. The tabs 65-68 of the bezel 32 are inserted into the openings 76-79, respectively, in the housing 30 so that the bezel 32 is attached to the trough 37 of the housing 30 by the barbs 65'-68'. Additionally, the ridges 57 and 58 of the bezel 32 reside within the channels 117 and 118, respectively, of the housing 30. In this position, then, the bezel 32 is firmly held in place.

Now the storage of the handset 10 within the housing 30 will be discussed. When the handset 10 is inactive, it is stored in the trough 37 of the housing 30. In this position, the collar 24 of the handset 10 resides within the aperture 98 of the housing 30, thereby securing the end 15 of the handset 10 within the trough 37. Furthermore, the end 12 is secured within the trough 37 by the latching mechanism 130, in the fully latched position. In particular, the tooth 137 of the catch 134 extends through the latching slot 44 of the speaker cup 40 and into the latching recess 25 of the handset 10, thereby retaining the end 12 of the handset 10 firmly within the trough 37. In this position, the of the handset 10. Furthermore, the body 130' is biased by the spring 47 so that the ridge 119 resides within the notch 136, adjacent to the button 36 and the tooth 135, thereby locking the body 130' in the fully latched position. Additionally, when the handset 10 is retained within the trough 37, the compressive resilient buttons 38 are compressed between the face 14 of the handset 10 and the trough 37. The buttons 38 thus exert a force on the handset 10, in an outward direction from the trough 37.

In this position, then, the handset 10 is firmly maintained within the trough 37 by the latching mechanism. Furthermore, if pressure is exerted on the handset 10 in a direction outward from the trough 37, the ridge-engaging tooth 135 is caused to more firmly contact the ridge 119 of the housing 30. Thus, if an attempt is made to remove the handset 10 from the trough 37 without disengaging the latching mechanism, the handset 10 will still be firmly retained.

The condition of the inactive handset 10 stored within the housing 30 will now be described further. A constant tension is maintained on the cord 23 by the spring-loaded cord reel 89. Most of the cord 23 is snugly wound upon the cord reel 89. In addition, the switch 85 is triggered, due to the presence of the handset 10 in the trough 37.

The process of disengaging the handset 10 from the trough 37 will now be discussed. In particular, referring to FIG. 9, the operation of disengaging the tooth 135 from the ridge-section 141 will be explained. This process commences when a caller depresses the rectangular button 36. The pressure on the button 36 causes the button 36 to travel toward the pin 97. As a result, the body 130' slides about the pin 97 and the spring 47 is thereby compressed. Additionally, during this sliding motion, the ridge-engaging tooth 135 is caused to slide against the ridge section 141 by the force exerted by the spring 46 upon the body 130'. Further movement of the body 130' causes the tooth 135 to disengage the ridge-section 141, as shown in FIG. 10.

Figure 10:
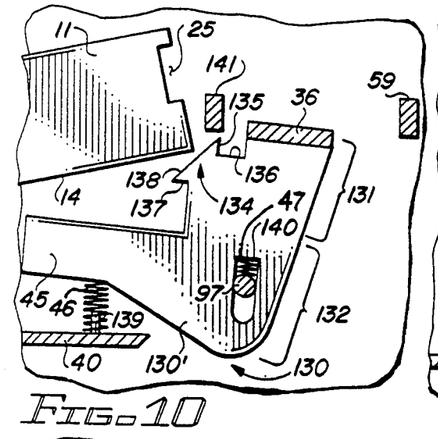
FIG. 10 is an orthogonal side view of the latching mechanism 130 of the present invention, cut-away from the line B—B', with the ridge-engaging tooth 135 disengaged from the ridge-section 141.

Referring now to FIG. 10, the operation of the present invention subsequent to the disengagement of the tooth 135 from the ridge-section 141 will be discussed. After the tooth 135 disengages the ridge-section 141, pressure upon the leg 45 by the spring 46 results in a sudden rotation of the body 130' about the pin 97, so that the first section 131 travels away from the handset 10. Hence, the handset-engaging tooth 137 is removed from the latching recess 25, thereby disengaging the handset 10. As a result of the disengagement of the handset 10, the handset 10 is permitted to be urged from the trough 37 by the compressive resilient buttons 38. In addition, the rotation of the leg 45 away from the speaker cup 40 urges the handset 10 further from the trough 37. Due to this sudden rotation, the natural tendency is for the user to release the button 36.

Figure 11:
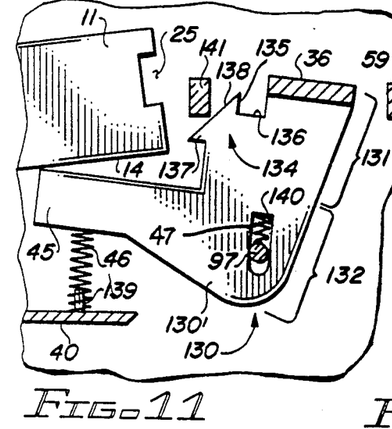
FIG. 11 is an orthogonal side view of the latching mechanism 130 of the present invention, cut-away from the line B—B', with the inclined plane 138 in contact with the ridge-section 141.

Referring now to FIG. 11, the operation of the invention immediately after the handset 10 is disengaged, and the caller releases the button 36, will be discussed. Due to the pressures exerted upon the body 130' by the spring 47 and the pressures exerted upon the leg 45 by the spring 46 and the handset 10, the body 130' is caused to slide in the direction defined by the aperture 140, as guided by the pivot pin 97. As a result, the inclined plane 138 is brought into contact with the ridge-section 141, as shown in FIG. 11. Pressure by the spring 46 upon the leg 45 results in rotation of the body 130' about the pin 97, and pressure by the spring 47 upon the body 130' results in the inclined plane 138 sliding against the ridge section 141. Accordingly, the handset 10 is urged further from the trough 37 by the leg 45.

Figure 13:
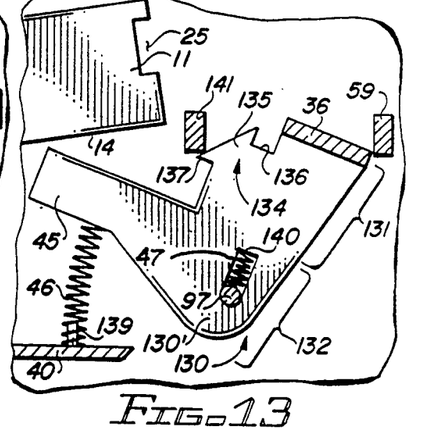
FIG. 13 is an orthogonal side view of the latching mechanism 130 of the present invention, cut-away from the line B—B', in the fully disengaged position.

Subsequent to the condition depicted in FIG. 11, the rotating and sliding movements of the body 130' stop when the button 36 contacts the barrier 59 and the pivot pin 97 contacts the portion of the body 130' adjacent to the aperture 140. Thus, the latching mechanism 130 has achieved the fully disengaged position, as shown in FIG. 13. Under normal conditions, the latching mechanism 130 will be maintained in this position by the springs 46 and 47 until the handset 10 is returned to the trough 37.

Figure 12:
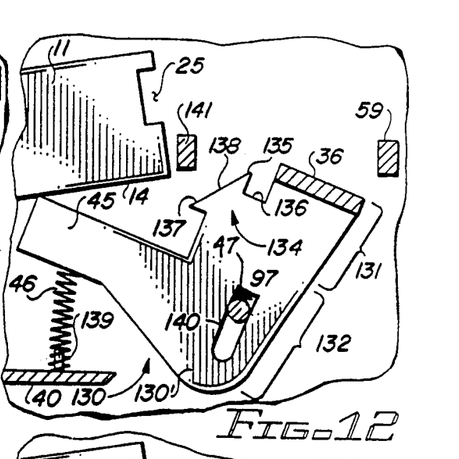
FIG. 12 is an orthogonal side view of the latching mechanism 130 of the present invention, cut-away from the line B—B', with the body 130' fully disengaged and fully depressed.
Figure 14:
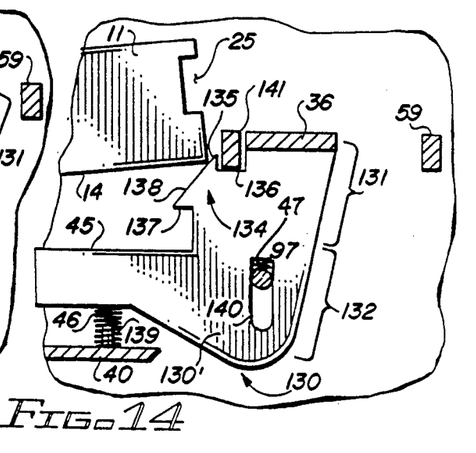
FIG. 14 is an orthogonal side view of the latching mechanism 130 of the present invention, cut-away from the line B—B', with the face 14 of the handset 10 in contact with the inclined plane 138.

Referring now to FIG. 14, the operation of the latching mechanism 130 will be discussed in the case where the user maintains pressure on the button 36 after the condition shown in FIG. 9 occurs. If the calling passenger does not release the button 36, but instead maintains pressure thereon, the body 130' is caused to rotate due to the pressure on the button 36 by the caller in conjunction with the pressure on the leg 45 from the spring 46. The direction of rotation causes the catch 134 to travel away from the ridge-section 141 as in FIG. 10. However, the inclined plane 138 does not contact the ridge-section 141 due to the pressure placed on the button 36 by the caller. This rotation is continued until the spring 47 is entirely compressed, as shown in FIG. 12. At this point, the body 130' has rotated to the fully disengaged and fully depressed position. As a result, the handset 10 is thus urged further from the trough 37 by the leg 45.

After the body 130 achieves the fully disengaged and fully depressed position, described above, and the button 36 is released, the body 130 is caused by the spring 47 to slide, as guided by the interaction between the pin 97 and the portion of the body 130' surrounding the aperture 140. The motion of the body 130' is stopped when the pivot pin 97 contacts the portion of the body 130 adjacent to the aperture 140, and the button 36 contacts the barrier 59. Thus, the latching mechanism 130 achieves the fully disengaged position, as shown in FIG. 13.

Figure 9:
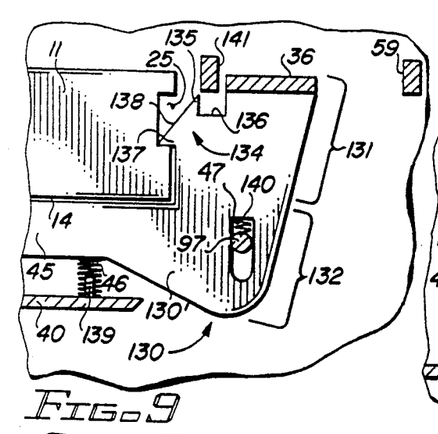
FIG. 9 is an orthogonal side view of the latching mechanism 130 of the present invention, cut-away from the line B—B', with the notch 136 removed from the ridge-section 141.

Therefore, whether the caller releases the button 36 after the latching mechanism 130 reaches the condition shown in FIG. 9, or maintains pressure upon the button 36 until the latching mechanism 130 reaches the condition shown in FIG. 12, the body 130 ultimately achieves the final condition illustrated in FIG. 13.

Further displacement of the handset 10 from the housing 30 will now be discussed. Subsequent displacement of the handset 10 from the housing 30 is manually performed by the caller. The caller grips the end 12 of the handset 10 and removes the handset 10 from the trough 37. Upon continued withdrawal of the end 12, the end 15 is displaced from the trough 37 and the collar 24 is disengaged from the aperture 98. Thus, the handset 10 is entirely removed from the housing 30. After removal of the handset 10 in this manner, the switch 85 is un-triggered.

A number of additional events occur upon displacement of the handset 10 from the housing 30. In particular, the operation of the cord reel 89 during displacement of the handset 10 from the housing 30 will now be described. Tension on the cord 23 from removal of the handset 10 causes the cord 23 to be pulled from the cord reel 89, thereby rotating the cord reel 89. The shell 88 maintains the cord 23 on the cord reel 89 for proper unwinding thereof. In addition, the shell 88 properly guides the cord 23 from the rotating cord reel 89 into the aperture 98, for use by the handset 10. Since the cord reel 89 is spring-loaded, a constant tension is maintained on the cord 23 throughout displacement of the handset 10 from the housing 30.

Referring now to FIGS. 1, 2, 3, 5, 6, 11, 12, and 13, the replacement of the handset 10 into the trough 37, with the latching mechanism 130 in the fully disengaged position of FIG. 13, will now be discussed. First, the end 15 is replaced by the caller. The microphone 19 is brought into the microphone cup 41 and the collar 24 is directed into the aperture 98. Slack in the cord 23, caused by the replacement of the handset 10, is taken up by the spring-loaded cord reel 89. Once the end 15 has been fully inserted into the trough 37, the end 12 is brought into the trough 37. After the speaker 18 sufficiently enters the speaker cup 40, contact is made between the leg 45 of the latching mechanism 130 and the front face 14 of the handset 10, as shown in FIG. 13. Further movement of the end 12 into the trough 37 causes displacement of the leg 45 toward the speaker cup 40 and compression of the spring 46. Accordingly, the body 130' is caused to rotate about the pin 97. As the end 12 is brought further inside the trough 37, the body 130' is slidably and rotatably moved about pin 97 so that inclined plane 138 slides against the ridge section 141, as shown in FIG. 11.

Further rotation of the body 130' causes the tooth 137 to protrude through the latching slot 44 and enter the latching recess 25, as shown in FIG. 9. In addition, the notch 136 is caused to move into a position adjacent to the ridge section 141. Subsequently, when the caller releases pressure on the handset 10, the body 130' is caused by the spring 47 to slide about the aperture 140 toward the ridge-section 141. Further sliding of the body 130' brings the ridge-section 141 into the notch 136, as shown in FIG. 6. The handset 10 is thus firmly maintained in the trough 37 by the latching mechanism 130.

Referring now to FIGS. 1, 2, 6, 13, 14, 15, and 16, replacement of the end 12 of the handset 10 will now be discussed in the case where the latching mechanism 130 is in the fully engaged position. Under normal conditions, the end 12 is replaced into the trough 37 when the latching mechanism 130 is in the fully disengaged position. However, when the end 12 is absent from the trough 37, pressure on the leg 45 can move the latching mechanism 130 into the fully latched position shown by FIG. 6. In this case, insertion of the handset 10 into the trough 37 causes the latching mechanism 130 to re-set into the fully disengaged position, then fully engage the handset 10.

Figure 15:
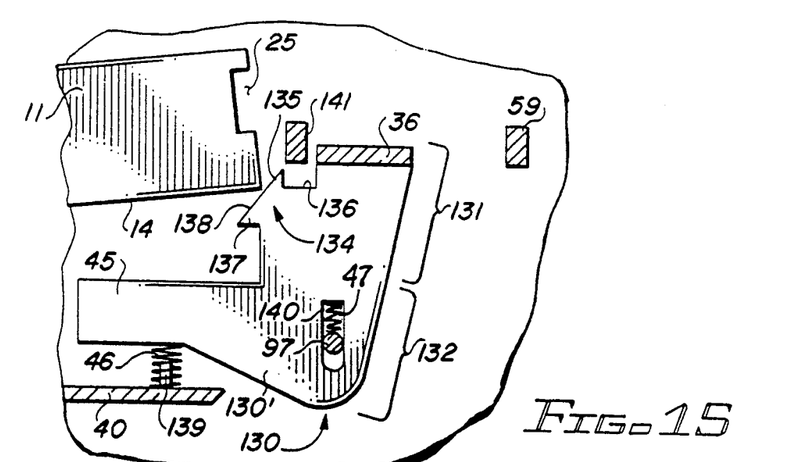
FIG. 15 is an orthogonal side view of the latching mechanism 130 of the present invention, cut-away from the line B—B', with the face 14 of the handset 10 in contact with the inclined plane 138 and the notch 136 displaced from the ridge-section 141.
Figure 16:
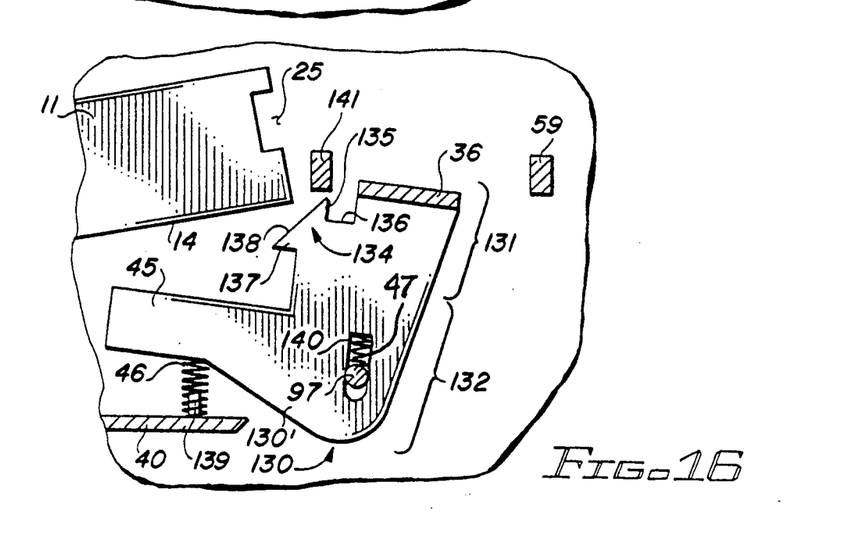
FIG. 16 is an orthogonal side view of the latching mechanism 130 of the present invention, cut-away from the line B—B', with the face 14 of the handset 10 in contact with the inclined plane 138 and the ridge-engaging tooth 135 disengaged from the ridge-section 141.

In particular, the end 15 is first replaced into the trough 37. Then, as the end 12 is moved into the trough 37, the front face 14 of the handset 10 is brought into contact with the inclined plane 138, as shown in FIG. 14. Upon further insertion of the end 12 into the trough 37, the front face 14 causes disengagement of the notch 136 from the ridge-section 141 and compression of the spring 47, as is shown in FIG. 15. After further insertion of the end 12 into the trough 37, the ridge-engaging tooth 134 is caused to travel past the ridge-section 141. Once this condition occurs, the body 130' is suddenly caused to rotate away from the handset 10 by pressure of the spring 46 upon the leg 45, as shown in FIG. 16. This rotation of the body 130' is continued due to the sliding of the inclined plane 138 against the ridge-section 141 and the pressure asserted on the leg 45 by the spring 46. Thus, the latching mechanism 130 is caused to re-set into the fully disengaged position, as shown in FIG. 13. Further replacement of the end 12 and return of the latching mechanism 130 to the fully latched position are therefore permitted to occur, as in the sequence of FIGS. 13, 11, 9, and 6, described above.

The present invention provides a number of advantages over prior arrangements. Since the handset 10 is wired to the housing circuit 80 and the housing circuit 80 is wired to remotely located central communications circuitry, the handset 10 functions without signal deterioration due to electromagnetic interference.

Another advantage is the compact size of the invention. The shell 88 permits the cord 23 to be wound and unwound from the cord reel 89 in a direction perpendicular to the circumference thereof. As a result, the cord reel 89 can be centered with respect to the longitudinal storage trough 37, effectively decreasing the overall vertical dimension of the housing-cord reel combination when installed in a seat back. In addition, the self-resetting latching mechanism is smaller than those of the current technology. Furthermore, since the latching mechanism 130 is hand-operated, it eliminates the need for a credit card slot in the housing 30. As a result, the longitudinal dimension required for the housing 30 has been decreased. The present invention, then, is more compact than prior arrangements.

Another advantage is the simplified installation the present invention provides. The installation of the invention has been simplified because the cord reel 89 is integrally attached to the housing 30. Therefore, the cord reel 89 and the housing 30 can be easily mounted simultaneously. Furthermore, adjustment of the cord reel 89 to properly interact with the housing 30 is unnecessary. In addition, the compact size of the invention makes installation easy. The reduced size of the housing 30 enables installation to be performed on any commercial airplane seat back without trimming the width of the housing 30 or cutting a notch in the housing 30 to accommodate a tray table latch. Therefore, installation of the present invention has been substantially simplified.

Another advantage is the simple cleaning and servicing that the present invention affords. The bezel 32 can be inserted and removed from the housing 30 without the use of any tools. By manually placing pressure on the tabs 65-68 from the inside of the trough 37, the barbs 65'-68' can be disengaged from the trough 37. Bezel 32 is thus disengaged from the housing 30 and can be fully removed from the housing 30 by sliding the bezel 32 in an outward direction from the housing 30. Removal of the bezel 32 is sometimes necessary for cleaning or replacement. Additionally, the bezel 32 must be removed before the surrounding upholstery is withdrawn. Since the bezel 32 is removable without tools, ordinary cleaning people without particular aircraft training are able to remove and replace the bezel 32 without difficulty.

Still another advantage is the simple operation of the invention. The handset 10 is dispensed upon the pressing of the button 36. Accordingly, the only operation requiring a credit card is that of swiping the card through the groove 22, for reading of the card's magnetic strip. Therefore, operation of the present invention is simpler than that of the current technology.

Another advantage provided by the present invention is the color stability and durability of the exposed components. The housing 30, the bezel 32, and the latching mechanism 130 are all formed from an ultraviolet light-resistant material such as a polycarbonate material. Consequently, the components of the invention that are exposed to view are protected from color degradation due to ultraviolet light. Additionally, these components are more resistive to damage.

While there have been shown what are at present considered to be preferred embodiments of the invention, it will be apparent to those skilled in the art that various changes and modifications can be made herein without departing from the scope of the invention as defined by the appended claims.

I claim:

1. A telephone station comprising:
   a telephone handset;
   a cord electrically attached to the handset;
   a cord reel assembly electrically attached to the cord;
   a housing having a face with an opening defined therein, the face also having defined therein a trough of dimensions suitable for receiving the handset, the trough additionally having at least one tab slot defined therein and further having a latching slot defined therein;
   a bezel removably attached to the housing, said bezel comprising:
      a plate having front and rear faces, said plate additionally having first and second apertures defined therein, the first aperture corresponding to the trough and the second aperture corresponding to the opening of the housing when the bezel is attached to the housing; and
      a flange formed on the rear side of the plate and having a latching opening corresponding to the latching slot of the trough when the bezel is attached to the housing, said flange also having at least one tab protruding therefrom, the tab being positioned to reside within a tab slot of the trough when the bezel is attached to the housing, thereby securing the bezel to the housing; and
   self-resetting latching means connected to the housing for retaining the handset in the trough and alternately urging the handset therefrom, the latching means having a fully latched position and a fully unlatched position.

2. The telephone station recited in claim 1, wherein the self-setting latching means comprises:

a generally planar body having an elongated hole defined therein; activating means connected to the boy for enabling a user to initiate movement of the latching means from the fully latched position to the fully unlatched position;

a leg formed upon the body for abutting the handset, said leg residing within the latching slot, said leg additionally residing within the latching opening when the bezel is attached to the housing;

a catch formed upon the body;

a first tooth formed upon the catch and extending through the latching slot when the latching means is in the fully latched position;

a second tooth formed upon the catch and protruding through the latching opening and additionally protruding through the latching slot when the latching means is in the fully latched position, said second tooth further residing within a latching recess defined in the handset when the handset is fully inserted into the trough;

an inclined plane formed on the catch and interposed between the first tooth and the second tooth;

a pivot pin attached to the housing and extending through the elongated hole;

a first spring interposed between the trough and the leg; and a second spring interposed between the body and the pin.

3. The telephone station recited in claim 1, wherein each tab has formed thereon a barb extending inward with respect to the first aperture of the bezel, thereby enabling the bezel to be firmly secured to the housing when the flange is inserted into the trough a sufficient distance so that the tab passes into the tab slot and said barb passes through the tab slot and accordingly snaps into firm contact with regions of the trough surrounding the tab slot, thus enabling the bezel to be easily detached from the housing without the use of tools by pressing the tab outward with respect to the first aperture of the bezel in order to disengage the barb from the regions of the trough surrounding the tab slot.

4. The telephone station recited in claim 1, wherein the telephone handset comprises a body having:

a front face having a speaker and a microphone formed thereon and protruding therefrom;

a rear face opposing the front face;

a first side connected to the front and rear faces;

a second side connected to the front and rear faces;

a first end having a collar formed thereon for retaining the first end of the handset within the trough; and a second end having a latching recess defined thereon.

5. The telephone station recited in claim 1, wherein the cord reel assembly comprises:

a cylindrical cord reel having a first axial hole defined therein;

a cylindrical connector residing in the first axial hole, said connector having a second axial hole defined therein which provides an axis for rotation of the cord reel;

a bolt residing in the second axial hole;

a generally cylindrical shell formed upon the housing and having a base and an arced side, the base being connected to the bolt;

at least one socket connected to the shell;

a cord reel cover having one or more holes defined therein; and at least one fastening means residing within the holes in the cord reel cover, the fastening means being connected to the socket, thereby cooperating with the shell to enclose the cord reel when the cord reel cover is secured to the shell.

6. The telephone station recited in claim 1, wherein the trough has a speaker cup defined therein for receiving the speaker and wherein the trough has a microphone cup defined therein for receiving the microphone.

7. The telephone station recited in claim 1, wherein the trough has at least one compressive resilient button attached thereto.

8. The telephone station recited in claim 1, wherein the rear surface of the bezel has at least one elongated ridge formed thereon and the housing has at least one channel defined therein, said channel being positioned to receive said ridges when the bezel is attached to the housing.

9. A telephone station comprising:

a telephone handset;

a cord electrically attached to the handset;

a housing having a front face with a trough defined therein for receiving the handset;

self-resetting latching means connected to the housing for retaining the handset within the trough and alternately urging the handset therefrom, said latching means having a fully latched position and a fully unlatched position, and comprising a generally planar body having an elongated hole defined therein;

a pivot pin connected to the housing and extending through the elongated hole, thereby allowing the body to slide and rotate about the pin;

a first spring interposed between the body and the pivot pin for biasing the body in a direction of sliding motion;

activating means connected to the planar body for initiating the urging of the handset from the trough by the latching means;

a leg formed upon the planar body for urging the handset from the trough in response to pressure upon the activating means;

a second spring interposed between the planar body and the trough for biasing the body in a direction of sliding motion; and a catch formed upon the planar body; and a removable bezel attached to the housing, comprising:

a plate having defined therein first and second apertures corresponding to the trough of the housing and an opening defined in the housing, respectively, when the bezel is attached to the housing; and a flange formed upon the plate so as to surround the first aperture of the bezel, said flange being of suitable dimension to reside within the trough when the bezel is attached to the housing.

* * * * *